United States Patent [19]

Williams

[11] Patent Number: 5,717,620

[45] Date of Patent: Feb. 10, 1998

[54] IMPROVED-ACCURACY FAST-FOURIER-TRANSFORM BUTTERFLY CIRCUIT

[75] Inventor: Terry Lee Williams, Melbourne Beach, Fla.

[73] Assignee: AirNet Communications Corporation, Melbourne, Fla.

[21] Appl. No.: 547,613

[22] Filed: Oct. 24, 1995

[51] Int. Cl.$^6$ ............................................. G06F 17/14
[52] U.S. Cl. ............................................. 364/726
[58] Field of Search ............................................. 364/726

[56] References Cited

U.S. PATENT DOCUMENTS

| | | | |
|---|---|---|---|
| 4,996,661 | 2/1991 | Cox et al. | 364/726 |
| 5,313,413 | 5/1994 | Bhatia et al. | 364/726 |
| 5,343,208 | 8/1994 | Chesley | 364/726 |
| 5,481,488 | 1/1996 | Luo et al. | 364/726 |

OTHER PUBLICATIONS

"PDSP16510A Stand Alone FFT Processor," *GEC Plessey*, pp. 200–220.

"PDSP16515A Stand Alone FFT Processor," *GEC Plessey*, Aug. 1994, pp. 1–23.

*Primary Examiner*—David H. Malzahn
*Attorney, Agent, or Firm*—Hamilton, Brook, Smith & Reynolds, P.C.

[57] ABSTRACT

A channelizer (16) and combiner (22) in a cellular-telephone base station (10) are implemented in fast-Fourier-transform butterfly circuits (FIG. 4) in which outputs of adders (40, 46) are applied to successive adders (46, 50) in bit alignment. Although this makes it necessary for the input to the first adder (40) to leave some of the adder's input-port bit width unused in order to avoid the carries that a bit-aligned architecture cannot accommodate, the resultant accuracy exceeds that of a bit-offset architecture, because it can take advantage of rounding (56, 58) applied to each fast-Fourier-transform pass's input operands.

12 Claims, 3 Drawing Sheets

$A' = A+B(W1)+C(W2)+D(W3)$
$B' = A-B(W1)-C(W2)+D(W3)$
$C' = A-B(W1)+C(W2)-D(W3)$
$D' = A+B(W1)-C(W2)-D(W3)$

BASIC RADIX 4 BUTTERFLY

IMPROVED-ACCURACY FAST-FOURIER-TRANSFORM BUTTERFLY CIRCUIT

BACKGROUND OF THE INVENTION

The present invention is directed to butterfly circuits for implementing the fast-Fourier-transform algorithm. It has particular application to such circuits used for channelizing and combining in wide-band radio sets.

It has recently become practical to employ digital signal processing for "channelizing" a wide-band radio signal, i.e., for de-multiplexing multiple frequency-division-multiplexed channels by, for instance, fast-Fourier transformation. For instance, a base station for cellular-telephone communication may be implemented in a manner exemplified by station 10 in FIG. 1, in which a wide-band digital tuner 12 receives a signal from an antenna 14, frequency translates a wide-band portion of that antenna signal's spectrum, and provides a sequence of complex samples of the resultant signal to a channelizer 16, which takes the form of fast-Fourier-transform ("FFT") butterfly circuits and related memory. The resultant frequency-bin contents are the inputs to respective channel-processing circuitry in the processing section 18 of the radio set. That is, each FFT frequency bin corresponds to a different signal channel, and the channelizer 16 separates the channels by performing the FFT operation.

Similarly, FFT circuitry is used to implement a digital combiner 22, which performs an inverse FFT on the contents of a plurality of channels to be transmitted. The resultant parallel inverse-FFT outputs are serialized, converted to analog form, and up-converted in frequency by an exciter 24 to produce a signal that a power amplifier 26 applies to a transmission antenna 28.

Advances in integrated-circuit-fabrication technology have made it possible to perform these wide-band operations digitally, but is still necessary to design such equipment carefully so that the speed requirements imposed are no greater than necessary. The economics of the cellular-telephone industry also necessitate strict cost control as well as conservation of base-station space.

Partly for these reasons, the FFT butterfly circuitry typically performs its operations in a block-floating-point manner. Unlike conventional floating-point operation, in which the operands and results are all expressed as a combination of an exponent and a mantissa so as to afford a wide dynamic range, block-floating-point operation does not maintain a separate exponent for such operand. Instead, only mantissas of a relatively large set of operands are all maintained separately; a single, common exponent is maintained for all operands in a given set. The exponents can be different for different sets, so the block-floating-point organization provides some of the dynamic-range advantages of conventional floating-point operation. Yet it requires only slightly more complexity than simple fixed-point mathematics.

FIG. 2 illustrates the manner in which block-floating-point organization has previously been implemented in a conventional FFT "butterfly" circuit. The FFT algorithm is well known and so will be described here only briefly. To reduce the complexity of performing a discrete Fourier transformation, the FFT algorithm employs the fact that a discrete Fourier transformation of a large sample set can be implemented by successively performing smaller-sized Fourier transformations of subsets of those samples, and of the smaller transformations' results, if appropriate adjustments are made on the various values in the course of repeating the transformations. A circuit for performing a single one of these small discrete Fourier transformations and the necessary adjustments (by so called "twiddle factors") is referred to as a "butterfly circuit."

Typically, although not necessarily, a single butterfly circuit will be used to perform several of the small-record-sized transformations that are required to obtain the transformation of the large record. For instance, transformation of a sixteen-sample input sequence can be performed by dividing the sample sequence into interleaved ("decimation in time") or consecutive ("decimation in frequency") subsequences. Each subsequence is subjected to an individual four-point discrete Fourier transformation with modification by respective "twiddle factors," which are respective sixteenth roots of unity. Each result of a given one of the four four-point initial transforms is then applied in a second pass to a different one of four second-pass butterfly operations, all of which are typically performed by the same butterfly circuit or circuits used for the first pass. The results of that second pass, i.e., of the second set of four butterfly operations, constitutes the overall FFT results. Of course, larger initial sample sizes require more butterfly operations in each pass, as well as more passes, but the computational complexity for an N-point FFT is only on the order of NlogN rather than $N^2$.

FIG. 2 depicts a typical FFT butterfly-circuit organization, while FIG. 3 illustrates the operation that the butterfly circuit is to perform. In the illustrated case, the butterfly circuit is "radix 4" butterfly circuit; i.e., three of the four inputs A, B, C, and D shown in FIG. 3 are subjected to respective twiddle factors $W_1$, $W_2$, and $W_3$ before a four-point DFT is performed on the twiddle-factor-adjusted inputs to produce butterfly outputs A', B', C' and D'. Although there is a certain computational advantage to employing a radix-4 butterfly (the complex multiplications of the transform itself, as opposed to the twiddle factors, can be implemented simply as a group of real additions and subtractions), those skilled in the an will recognize that the teachings of the present invention are applicable to other radices, too. Additionally, although I have chosen to illustrate the approach by means of a decimation-in-time butterfly circuit, it will be apparent that the advantages of the invention described below can also be obtained in decimation-in-frequency circuits.

In the example of FIG. 2, the FFT operation is to be performed on a sixteen-bit-wide data stream, but the FFT circuitry itself employs an eighteen-bit wide data path so as to limit the error that its repetitive computations introduce. To begin overall FFT operations, a steering circuit 30 in FIG. 2 selects the sixteen-bit inputs at its right-hand input port, which receives all of the FFT input samples. It forwards those samples to an inter-pass memory 32, from which all of the butterfly circuits (if more than one is employed) receive their inputs.

A multiplier 34 in FIG. 2 performs the several real multiplications of the complex input values' real and imaginary components by respective twiddle-factor components obtained from a twiddle-factor read-only memory 36. The multiplier 34 does not receive its other inputs directly from the inter-pass memory 32 but rather has them forwarded to it by a shifter 38. The function of shifter 38 is to shift all values by the same, common number of bits, the number being selected so that the highest-magnitude value of all of the inputs to a single FFT pass occupies all bits of the multiplier input port to which it is applied.

To this end, a bit-growth detector 39 monitors the inputs to the inter-pass memory 32 so as to keep track of the largest value applied during any given pass. This is equivalent to keeping track of the lowest number of sign bits in any value in a given pass. This can be appreciated by considering the following simplified example. For the sake of simplicity, we will assume that the width of the port to which the stage-memory outputs are applied is only four bits, rather than the eighteen bits shown in FIG. 2. For the sake of concreteness, we will also assume that the butterfly circuit represents its operands in two's-complement format. This means that the range of values would be from −8, represented by 1000, to +7, represented by 0111. That is, the leftmost bit represents the sign, and the other three bits represent the magnitude. The three magnitude bits are simply the binary value of the magnitude in the case of a positive number, while in the case of a negative value they are the bitwise complement of one less than the magnitude.

In the case of both of these extreme values, −8 and +7, the bit to the left of the sign bit differs from the sign bit. This is a characteristic of the higher half of the magnitude range. In contrast, the bit to the right of the sign bit for values in the magnitude range's lower half is the same as the sign bit and is sometimes referred to as a second sign bit.

Now, if all of the values in the stage memory 32 have multiple sign bits and are applied to the multiplier 34 without shifting, the multiplier's product will not have the full resolution that the multiplier's width could otherwise afford it. To avoid this loss of resolution, the bit-growth detector 39 monitors the number of sign bits of all the values that enter the stage memory 32 in a given FFT pass and keeps track of the lowest number of sign bits for any input. It then controls the shifter 38 to shift all multiplicands by one less than the lowest number of bits observed in any single stage. In effect, the shifter 38 multiplies all values in a given pass by a power of 2 large enough to cause the pass's largest value to have only one sign bit and thereby "fill" the input port of multiplier 34, to which it is applied.

Now, the common-exponent nature of block-floating-point operation necessitates that all values at a given stage be shifted by the same amount, so this resolution maximization results only for the largest values in a given stage. But this approach does afford the maximum resolution permitted by the multiplier's size and the strictures of block-floating-point operation.

The multiplier 34 performs the four real multiplications of which each of the three complex multiplications $BW_1$, $CW_2$, and $DW_3$ consists. Then each real or imaginary part of an individual complex value in the butterfly-operation output can be generated from a series of addition operations involving the resultant multiplier products or the sums computed in subsequent addition operations.

Specifically, a first adder 40 receives from an intra-pass register 42 the results of the individual real multiplications that the twiddle-factor multiplier 34 performs. Although the product of two eighteen-bit operands is potentially thirty-five bits, the multiplier output is truncated to eighteen bits before being stored in the first intra-pass memory 34. The first adder 40 completes the complex multiplications by adding pairs of these products, and it stores the results in a second intra-pass register 44. The first adder 40, as well as subsequent adders, are eighteen-bit adders: each of its two input ports receives eighteen bits, and its output accordingly consists of nineteen bits to accommodate a carry. Since a second adder 46 is to add the sums that the first adder 40 produces, the second intra-pass register 44 receives only the most-significant eighteen bits of the first adder's output. That is, the butterfly circuit forwards an adder's output to the next output's input port with a one-bit offset, and the least-significant bit is discarded. The second intra-pass register 44 contains the results of the completed complex multiplications, and the second adder 46 performs the real additions necessary to add two of these complex results together. By way of a multiplexer 47, it also adds the A value, which is not multiplied by a twiddle factor, to one of the complex results. A third intra-pass register 48 receives the most-significant eighteen bits of each result, and a third adder 50 adds those two results together to produce each component of a single complex value in the resultant-butterfly operation output.

The third-adder output potentially consists of nineteen bits, too, so it would seem logical for its output bits sent to the inter-pass memory 32 for use in the next pass of the FFT calculation to be only the most-significant eighteen bits. However, adder 50 produces a carry only if carries are produced in both previous adders, and this almost never happens for the kinds of input signals encountered in many applications. For such applications, a selection circuit 52 affords the user the opportunity to select the least-significant eighteen bits for storage in the inter-pass memory 32.

Note that the purpose of this design is to maximize accuracy by using bit shifting to take advantage of as many of the circuit's bit positions as possible. For example, the shifter 38 shifts the inter-pass memory 32's outputs so that each pass's largest output has only a single sign bit at the multiplier input port. This can be thought of as multiplying all of the inter-pass memory 32's outputs by a power of two large enough that the largest value in the pass "fills" the corresponding multiplier input port. Furthermore, the output bits produced by the multiplier are so applied to intra-pass memory 42's input ports that the largest values may completely "fill" corresponding locations in that memory and thereby fill respective input ports of the first adder 40.

SUMMARY OF THE INVENTION

Although attempting to fill the various computation circuits to the extent possible at first appears to maximize accuracy, I have recognized that error can actually be reduced by an approach that prevents the first adder's input ports from being filled, i.e., that ensures that all inputs will have multiple sign bits. According to this approach, an adder's output is applied to a subsequent adder's input port without the offset depicted in FIG. 2. Instead, operands are forwarded in bit alignment, i.e., with the least-significant bit of a given adder's output applied as the least-significant bit of the next adder's input and all other bits correspondingly applied. Since this necessitates discarding an adder's carry bit, extra sign bits must be applied to the first adder to prevent the occurrence of a carry. But forwarding operands in bit alignment enables me to take advantage of the accuracy benefits that come from rounding the multiplier output, as will become apparent below.

BRIEF DESCRIPTION OF THE DRAWINGS

These and further features and advantages of the present invention are described below in connection with the accompanying drawings, in which.

DETAILED DESCRIPTION OF AN ILLUSTRATIVE EMBODIMENT

Figure 1:
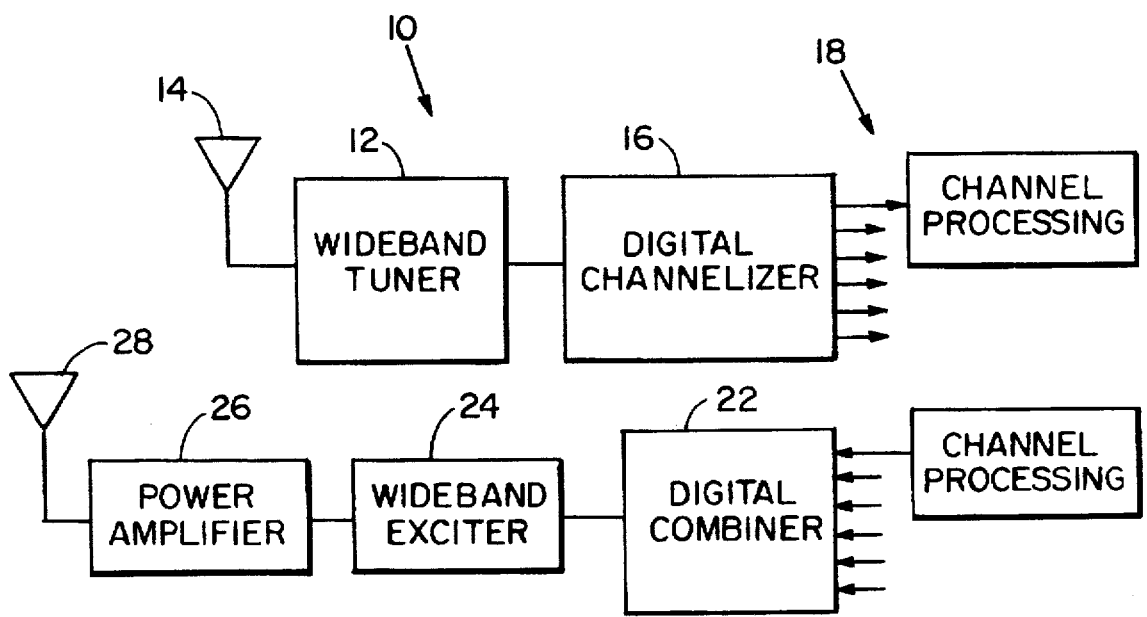
FIG. 1, already described, is a block diagram of a cellular-telephone base station in which the teachings of the present invention can be employed.
Figure 3:
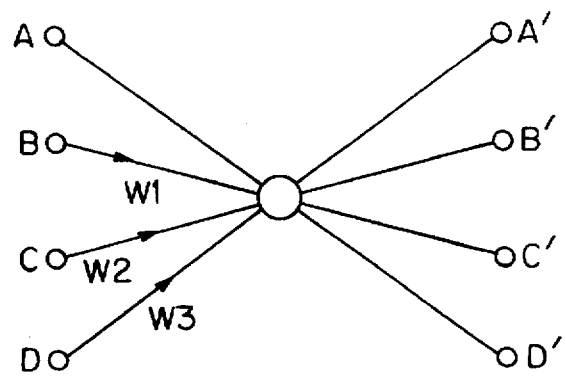
FIG. 3, previously described, is a diagram depicting the mathematical operations that a radix-four decimation-in-time butterfly circuit performs.
Figure 2:
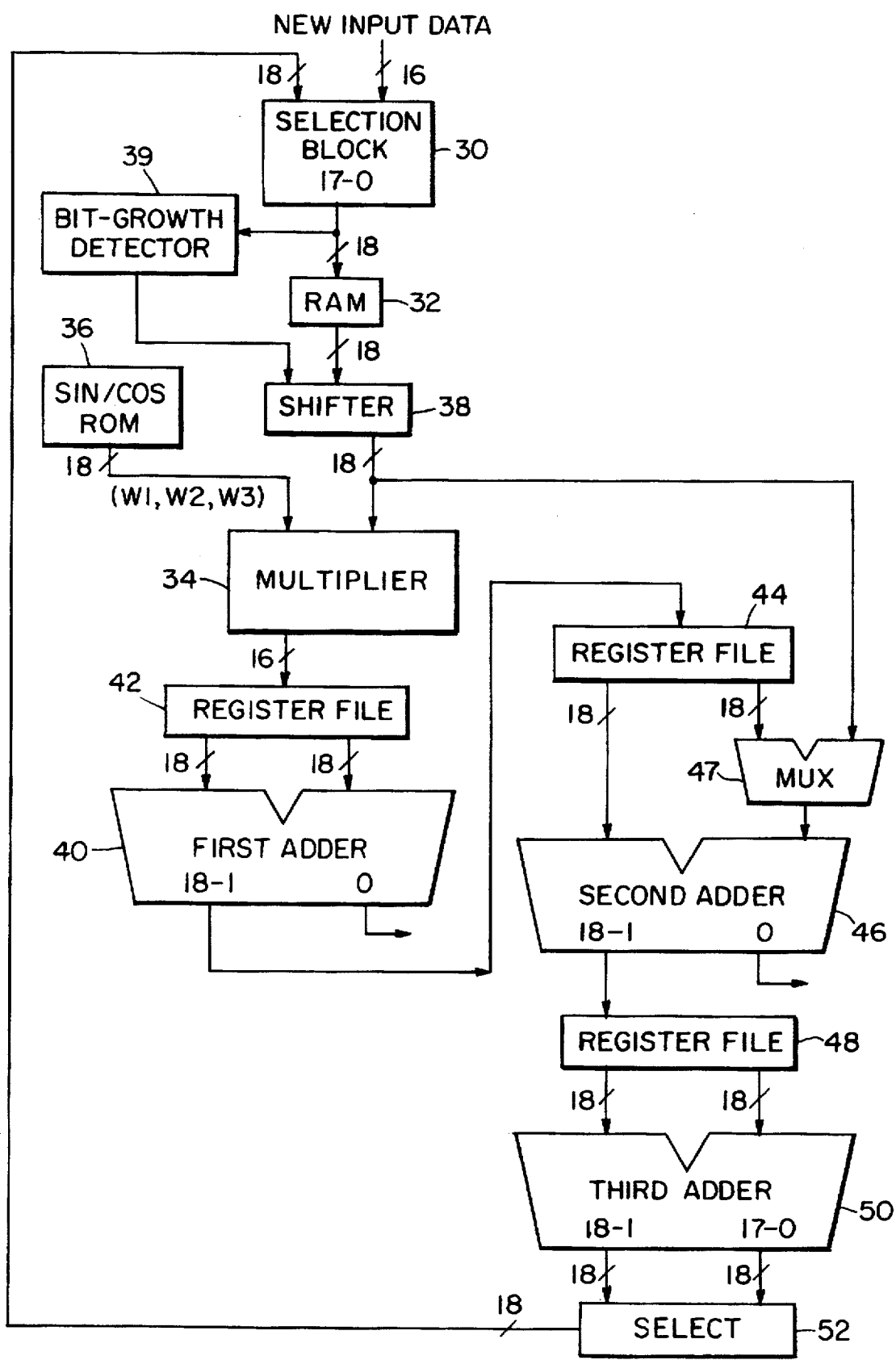
FIG. 2, previously described, is a block diagram of a prior-art butterfly circuit employed in the channelizer and combiner depicted in FIG. 1.
Figure 4:
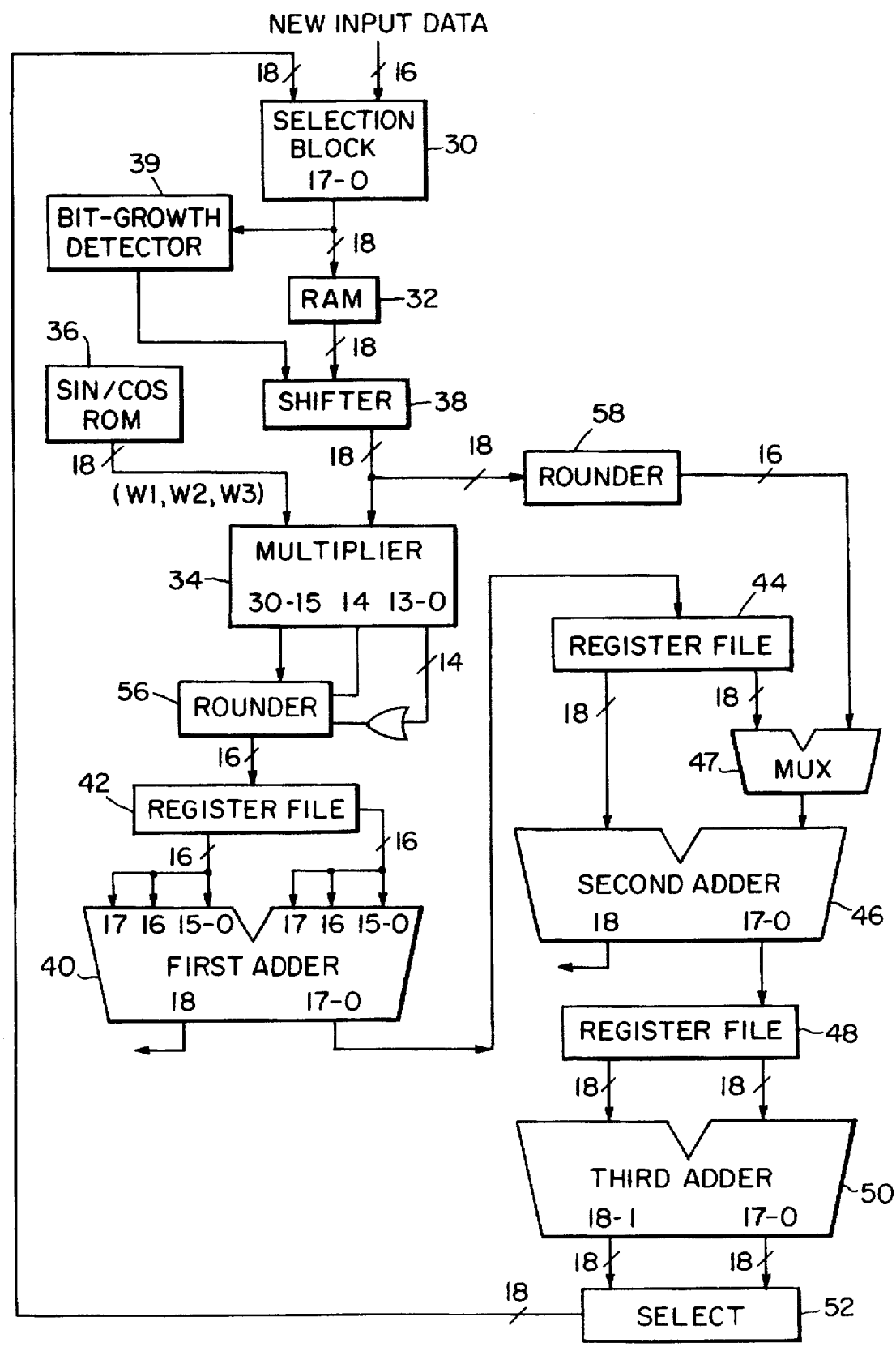
FIG. 4 is a block diagram of a butterfly circuit that employs the teachings of the present invention.

The major components of the butterfly circuit of FIG. 4 are largely identical to those in that of FIG. 2, already described, and corresponding elements accordingly have the same reference numerals. The major differences are (1) the bit correspondences with which the butterfly's forwarding circuitry forwards data from one adder to the next and (2) the data rounding that it then becomes profitable to do.

We first consider the bit correspondences. Although the shifter 38 still operates to "fill" the multiplier input port, the first intra-pass register 42 receives only sixteen bits of the resultant output, not eighteen, and the first adder 46 receives these as its input's least-significant sixteen bits. That input's two most-significant bits, i.e., bits 16 and 17, are forced to the same values as bit 15 so that the first adder's inputs always have at least three sign bits. This prevents the first adder from generating a carry. The first adder's carry bit is therefore discarded and its least-significant bit retained for application as the least-significant bit to the second adder: the first adder's output is applied to the second adder's input ports in bit alignment. This differs from the arrangement of FIG. 2, in which there is an offset between the first adder's output port and the second adder's input ports.

We now turn to the other difference, namely, that the sixteen bits applied to the first intra-pass register result not from truncation but rather from a rounding operation represented by block 56. Similarly, as is represented by another rounding block 58, the A value is rounded to sixteen bits and applied to the second adder, and its sign bit is replicated twice, as the drawing shows. That is, the A value occupies only the least-significant sixteen of the second adder's eighteen-bit input port.

The advantages of the present invention can be appreciated by considering the result of what at first appears to be the superior resolution of the prior-art FIG. 2 approach. The resolution of the input to FIG. 2's adder train is eighteen bits, as opposed to only sixteen bits in FIG. 4. However, as the values proceed through the adders, the FIG. 2 butterfly circuit discards a least-significant bit twice, thereby reducing the resolution that would otherwise result from the one-bit "growth" possible in each adder. In contrast, although most-significant bits are discarded in the arrangement of FIG. 4, those bits contain no information, and the bit growth is retained. The two bits of additional resolution that the FIG. 2 arrangement seemed initially to have are thus seen to be illusory: both approaches end up with the same resolution.

But the accuracy that results from the FIG. 4 approach is greater. As is well known in the art, rounding results in less error introduction than truncation, and the benefits of the rounding that I employ in the steps represented by blocks 56 and 58 remain because the circuitry of the FIG. 4 embodiment forwards operands from adder to adder in bit alignment. In contrast, the bit-offset forwarding practiced in the prior art enforces truncation, so rounding the multiplier output to the eighteen bits of the first adder input in the FIG. 2 arrangement would yield no benefit.

By thus re-aligning the FFT-butterfly signal train, I have been able to reduce noise by as much as 10 db without the speed and hardware costs of increased circuit resolution. The illustrated invention thus constitutes a significant advance in the art.

What is claimed is:

1. A fast-Fourier-transform butterfly circuit comprising:
   A) a stage memory for receiving butterfly-operation outputs and supplying butterfly-operation inputs; and
   B) a block-floating-point computation engine for receiving butterfly-operation inputs from the stage memory and performing a sequence of additions and multiplications that constitute a fast-Fourier-transform butterfly operation on the stage inputs, the computation engine comprising:
      i) at least one digital multiplier, comprising a pair of multiplier input ports and a multiplier output port, for receiving at its multiplier input ports multiplier input signals representing multiplicands and for generating at its output port a multiplier output signal representing the product of those multiplicands;
      ii) a plurality of digital adders, each comprising an adder output port and a pairs of adder input ports, for receiving at its adder input ports adder input signals representing addends and for generating at its output port an adder output signal representing the product of those addends, and
      iii) forwarding circuitry for:
         a) receiving the multiplier output signal and applying adder input signals to at least one of the adders in response thereto; and
         b) receiving adder output signals from at least a first of the adders to an input port of a second one of the adders in bit alignment.

2. A fast-Fourier-transform butterfly circuit as defined in claim 1 wherein:
   A) the computation engine includes a third adder; and
   B) the forwarding circuitry forwards signals from the output port of the second adder in bit alignment to an input port of the third adder.

3. A fast-Fourier-transform butterfly circuit as defined in claim 2 further including:
   A) a shifter by which the computation engine receives the butterfly-operation inputs from the stage memory, the shifter being adapted for application of a shift-indicating signal thereto for forwarding all the butterfly-operation inputs of a given fast-Fourier-transform stage to the computation engine with a common bit shift indicated by the shift-indicating signal; and
   B) a bit-growth detector for monitoring the butterfly-operation outputs received by the stage memory and for applying to the shifter a shift-indicating signal indicating such a shift that the largest-value input has only a single sign bit.

4. A fast-Fourier-transform butterfly circuit as defined in claim 3 wherein:
   A) the multiplier output port is an N-bit output port;
   B) the adder to which the forwarding circuitry applies an adder input in response to the multiplier output is an M-bit port, where M>N; and
   C) the forwarding circuitry generates adder input signals by rounding the multiplier output signals.

5. A fast-Fourier-transform butterfly circuit as defined in claim 2 wherein:
   A) the multiplier output port is an N-bit output port;
   B) the adder to which the forwarding circuitry applies an adder input in response to the multiplier output is an M-bit port, where M>N; and
   C) the forwarding circuitry generates adder input signals by rounding the multiplier output signals.

6. fast-Fourier-transform butterfly circuit as defined in claim 1 wherein:

A) the multiplier output port is an N-bit output port;

B) the adder to which the forwarding circuitry applies an adder input in response to the multiplier output is an M-bit port, where M>N; and C) the forwarding circuitry generates adder input signals by rounding the multiplier output signals.

7. In a cellular-telephone base station including a demultiplexer, for dividing a multiple-channel input signal into separate frequency bands, comprising a fast-Fourier-transform butterfly circuit for performing a fast Fourier transform on the input signal, the improvement wherein the butterfly circuit comprises:

A) a stage memory for receiving butterfly-operation outputs and supplying butterfly-operation inputs; and B) a block-floating-point computation engine for receiving butterfly-operation inputs from the stage memory and performing a sequence of additions and multiplications that constitute a fast-Fourier-transform butterfly operation on the stage inputs, the computation engine comprising:

i) at least one digital multiplier, comprising a pair of multiplier input ports and a multiplier output port, for receiving at its multiplier input ports multiplier input signals representing multiplicands and for generating at its output port a multiplier output signal representing the product of those multiplicands;

ii) a plurality of digital adders, each comprising an adder output port and a pairs of adder input ports, for receiving at its adder input ports adder input signals representing addends and for generating at its output port an adder output signal representing the product of those addends, and iii) forwarding circuitry for:

a) receiving the multiplier output signal and applying adder input signals to at least one of the adders in response thereto: and b) receiving adder output signals from at least a first of the adders to an input port of a second one of the adders in bit alignment.

8. A cellular-telephone base station as defined in claim 7 wherein:

A) the computation engine includes a third adder; and

B) the forwarding circuitry forwards signals from the output port of the second adder in bit alignment to an input port of the third adder.

9. A cellular-telephone base station as defined in claim 8 further including:

A) a shifter by which the computation engine receives the butterfly-operation inputs from the stage memory, the shifter being adapted for application of a shift-indicating signal thereto for forwarding all the butterfly-operation inputs of a given fast-Fourier-transform stage to the computation engine with a common bit shift indicated by the shift-indicating signal; and B) a bit-growth detector for monitoring the butterfly-operation outputs received by the stage memory and for applying to the shifter a shift-indicating signal indicating such a shift that the largest-value input has only a single sign bit.

10. A cellular-telephone base station as defined in claim 9 wherein:

A) the multiplier output port is an N-bit output port;

B) the adder to which the forwarding circuitry applies an adder input in response to the multiplier output is an M-bit port, where M>N; and C) the forwarding circuitry generates adder input signals by rounding the multiplier output signals.

11. A cellular-telephone base station as defined in claim 8 wherein:

A) the multiplier output port is an N-bit output port;

B) the adder to which the forwarding circuitry applies an adder input in response to the multiplier output is an M-bit port, where M>N; and C) the forwarding circuitry generates adder input signals by rounding the multiplier output signals.

12. A cellular-telephone base station as defined in claim 7 wherein:

A) the multiplier output port is an N-bit output port;

B) the adder to which the forwarding circuitry applies an adder input in response to the multiplier output is an M-bit port, where M>N; and C) the forwarding circuitry generates adder input signals by rounding the multiplier output signals.

* * * * *